United States Patent [19]
Jaeger

[11] Patent Number: 5,805,145
[45] Date of Patent: Sep. 8, 1998

[54] CIRCUIT CONTROL PANEL DISPLAYING CHANGEABLE GRAPHICS

[75] Inventor: Denny Jaeger, Oakland, Calif.

[73] Assignee: Intertactile Technologies Corporation, Oakland, Calif.

[21] Appl. No.: 644,796

[22] Filed: May 10, 1996

Related U.S. Application Data

[63] Continuation-in-part of Ser. No. 420,438, Apr. 10, 1995, Pat. No. 5,572,239, which is a continuation of Ser. No. 225,782, Apr. 11, 1994, abandoned, which is a continuation-in-part of Ser. No. 147,545, Nov. 5, 1993, abandoned.

[51] Int. Cl.$^6$ ........................................................ G09G 5/00
[52] U.S. Cl. .............................. 345/172; 345/184; 341/23
[58] Field of Search ..................................... 345/168, 169, 345/170, 171, 172, 173, 184, 905; 341/22, 23, 28, 33, 34

[56] References Cited

U.S. PATENT DOCUMENTS 5,418,760   5/1995   Kawashima et al. .................... 345/173

FOREIGN PATENT DOCUMENTS

2038055   7/1980   United Kingdom ................... 345/172
9512877   5/1995   WIPO .

*Primary Examiner*—Regina Liang
*Attorney, Agent, or Firm*—Harris Zimmerman

[57] ABSTRACT

The operator manipulated rotary knob, sliding knob, depressible button or the like of an electrical circuit control device is situated at the face of an image display screen within the image display area. This enables display of calibration marks and/or other graphics pertinent to operation of the control including at locations immediately adjacent to the operator manipulated component. The graphics may change instantly when the function of the control is changed. Conductors for connecting the control device with the controlled circuit extend along a front or back surface of the transparent cover plate of the display or an overlay cover plate within the image display area. The conductors, which may be opaque or transparent, are positioned to avoid or minimize obscuring of images by the conductors. At least portions of the conductors overlay zones which are between the parallel rows or columns of image pixels and may be angled relative to the rows and columns and/or be spaced apart by a distance which is not an integral multiple of the spacing of the rows or columns.

22 Claims, 5 Drawing Sheets

CIRCUIT CONTROL PANEL DISPLAYING CHANGEABLE GRAPHICS

CROSS REFERENCE TO RELATED APPLICATIONS

This is a continuation-in-part of copending application Ser. No: 08/420,438 filed Apr. 10, 1995, now U.S. Pat. No. 5,572,239, which was a continuation of application Ser. No: 08/225,782 filed Apr. 11, 1994 and which is now abandoned. Application Ser. No: 08/225,782 was a continuation-in-part of application Ser. No: 08/147,545 filed Nov. 5, 1993 which is now abandoned.

TECHNICAL FIELD

This invention relates to devices which enable operator control of electrical circuits. More particularly the invention relates to manually operated circuit control devices which are associated with an electronic display screen that displays changeable images which convey information pertinent to operation of the circuit control device.

BACKGROUND OF THE INVENTION

Devices for enabling operator control of electrical apparatus may variously have turnable or slidable knobs, depressible switch buttons, pivotable levers or the like which are manipulated by an operator in the course of controlling the apparatus. In most cases symbols, legends graduation marks or other graphics are associated with the control device. The graphics identify settings of the operator manipulated member, identify the function of the control device or provide other information which facilitates operation of the control. Graphics of this kind are often permanently imprinted at a location adjacent to or close to the operator manipulated element of the control device.

Imprinted graphics can convey only a limited amount of information and cannot be easily changed. Many recent electronic systems have controls that are used for different purposes during different modes of operation of the system. Permanent graphics designed to facilitate one mode of operation of the system are usually inappropriate during other modes of operation. Plural sets of labels, graduation marks and the like can be imprinted on the face of a control panel or the like but this can be confusing to the operator and can cause imprecise setting of a control if some of the graphics must be located away from the immediate vicinity of the operator manipulated member of the control. An overlay having different graphics can be placed on a control panel or the like when the functions of the controls change but this is a diversion which complicates and slows operation of the controls.

It has heretofore been recognized that operation of circuit control devices can be facilitated by using an electronic image display screen to provide graphics pertaining to operation of a circuit control device. The graphics can change instantly and automatically when the function of the control device changes.

In most prior circuit controls of this kind the electronic display screen is situated on a control panel or other support at location that is adjacent to or near the control member that is manipulated by an operator. The image area of the screen is smaller than the total area of the face of the screen as structural framing, seals, electrical conductors and the like are situated in the marginal region of the screen. Consequently, labels and other graphics are necessarily spaced a distance away from the knob, button, key or the like to which they relate. This is not conducive to display of calibration marks or other graphics in immediate proximity to the movable member of the control device and can result in operator confusion as to which control a particular graphic relates to in instances where plural controls are present on a control panel.

Changeable graphics can be displayed in immediate proximity to a circuit control device by situating the device within the image display area of an image display screen. One or more electrical conductors are needed to connect the device with the controlled circuit. In the absence of the present invention, the circuit connection conductors can have an adverse effect on image quality if they extend across one or more locations on the screen at which graphics are to be displayed.

The present invention is directed to overcoming one or more of the problems discussed above.

SUMMARY OF THE INVENTION

In one aspect of the present invention, a control panel for an electrical circuit has at least one control device that can be manually operated to change an electrical condition in the circuit and at least one circuit connecting conductor for electrically connecting the control device to the circuit. An electrically controlled image display screen displays changeable images that convey information pertinent to operation of the control device, the display screen having a transparent cover plate with an image display area wherein the changeable images are defined by a plurality of parallel lines of image pixels. The control device is attached to the transparent cover plate and is situated at least partially within the image display area. The circuit connecting conductor extends along the transparent cover plate within the image display area and at least a portion of the conductor is positioned and aligned to overlay and extend along a zone that is located between an adjacent pair of the parallel lines of image pixels.

In another aspect of the invention, a control panel for an electrical circuit includes a flat panel display having a transparent cover plate and an image display area thereat in which changeable images are defined by a plurality of parallel lines of image pixels arranged in rows and columns of pixels. A manually operable electrical circuit control device is secured to the cover plate within the image display area. At least one circuit connecting conductor extends along the cover plate within the image display area from the circuit control device to a marginal region of the flat panel display. The circuit connecting conductor is parallel to the lines of image pixels and overlays a zone which is between two adjacent lines of pixels.

In another aspect of the invention, a control panel for an electrical circuit includes a flat panel display having a transparent cover plate and an image display area thereat in which changeable images are defined by a plurality of parallel lines of image pixels arranged in rows and columns of pixels. A manually operable electrical circuit control device is secured to the cover plate within the image display area. At least one circuit connecting conductor extends along the cover plate within the image display area from the circuit control device to a marginal region of the flat panel display. The circuit connecting conductor extends in an angled relationship with the lines of pixels of the flat panel display.

In a further aspect of the invention, a control panel for an electrical circuit includes a flat panel display having a transparent cover plate and an image display area thereat wherein changeable images are defined by a plurality of parallel lines of image pixels arranged in rows and columns of pixels. Corresponding points on successive lines of pixels have a uniform spacing. A manually operable electrical circuit control device is secured to the cover plate within the image display area. At least a pair of circuit connecting conductors extend along the cover plate within the image display area from the circuit control device to a marginal region of the flat panel display. The pair of circuit connecting conductors are parallel with each other and are spaced apart from each other by a distance which is equal to a fraction of the uniform pixel spacing added to an integral multiple thereof.

The invention provides instantly changeable labels, calibration marks and/or other graphics for one or more circuit control devices which graphics may have any desired form and be at any desired location in the vicinity of the operator manipulated component of the control. For this purpose the control device is situated at the face of an electrically controlled image display screen and is at least partially within the image display area of the screen to enable presentation of graphics in close proximity to the operator manipulated component. The display screen is of the passive or active matrix type in which images are produced at minute image pixels arrayed in rows and columns of pixels. One or more conductors are situated at a surface of a transparent cover plate of the display screen and extend within the image viewing area of the screen from the control device to a marginal region of the screen to enable connection of the control device to a controlled circuit. The invention provides particular positionings of the circuit connecting conductors relative to the rows and columns of image pixels which avoid or minimize obscuring of image pixels by the conductors. In one arrangement the conductors extend along zones which are situated between adjacent pairs of pixel rows or pixel columns. In another arrangement, the conductors are spaced from each other in a manner which prevents simultaneous obscuring of pixels of more than one row or column of pixels when the screen is viewed from different viewing angles. In another arrangement, the conductors extend at a small angle relative to the rows of pixels or relative to the columns of pixels. The transparent cover plate of the display screen to which which the control device is fastened and along which the circuit connecting conductors extend may be the original cover plate of the screen or may be an overlay on the original cover plate of a pre-existing display screen. The circuit connecting conductors preferably extend along the back of the transparent cover plate to locate the conductors close to the image pixels. This avoids or minimizes obscuring of pixels when the screen is viewed obliquely. The invention makes it practical to use low resistance opaque metal conductors at the face of the screen without causing any discernible obscuring of the image or with minimal obscuring of the image. The invention also avoids or minimizes image degradation in instances where the conductors are formed of transparent material.

The invention, together with further aspects and advantages thereof, may be further understood by reference to the following description of the preferred embodiments and by reference to the accompanying drawings.

BRIEF DESCRIPTION OF THE DRAWINGS

FIG. 11 is a frontal view of a portion of still another control panel illustrating a preferred construction of the panel in instances where transparent conductor material is used to connect circuit control devices with FIG. 12 is an enlarged view of the portion of FIG. 11 which is encircled by dashed circle 12 therein.

FIG. 13 is a section view taken along line 13—13 of FIG. 12.

DETAILED DESCRIPTION OF THE PREFERRED EMBODIMENTS

Figure 1:
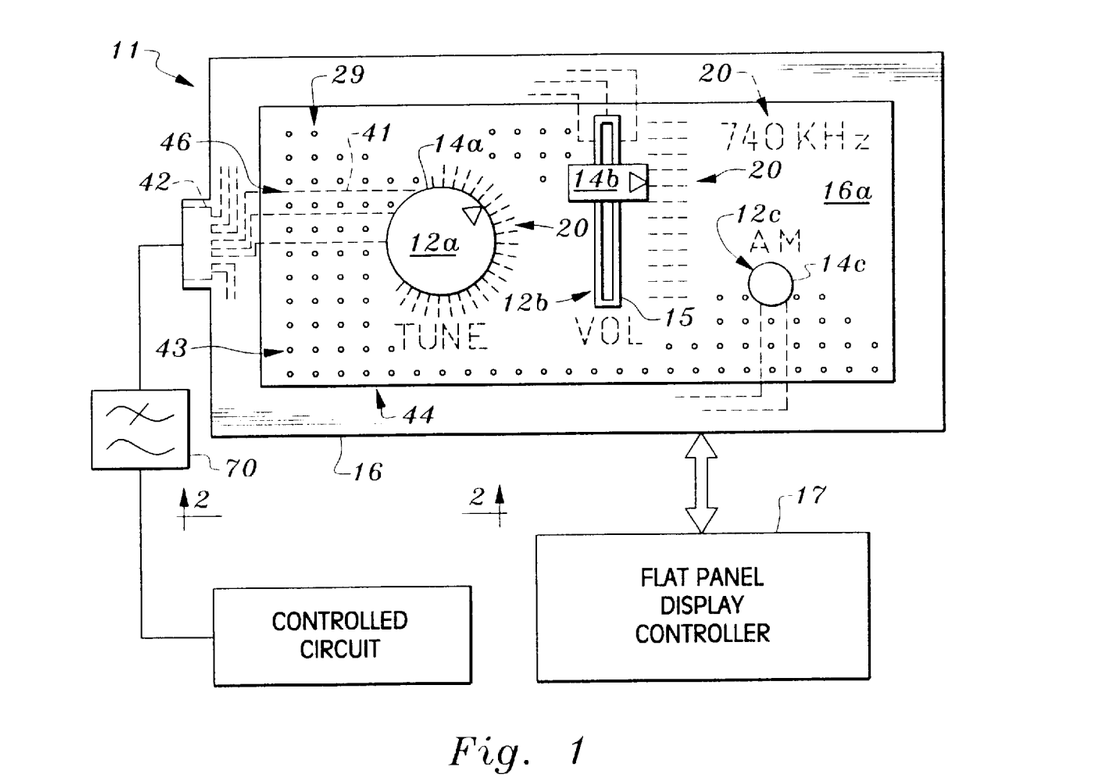
FIG. 1 is a front view of an electrical circuit control panel embodying the invention.

Referring initially to FIG. 1 of the drawings, a control panel 11 embodying the invention has one or more electrical circuit control devices 12a, 12b and 12c of the types which are manually operated to change an electrical condition in a controlled electrical circuit 13. In this particular example, control device 12a is a rotary potentiometer of the form having a knob 14a which is turned by an operator to vary the magnitude of a control signal voltage. Control device 12b is a linear potentiometer or fader having a knob 14b which is slid along a track 15 to vary an output voltage. Control device 12c is a switch which is operated by depressing a a button 14c. These control devices 12 may be replaced with or augmented by other control devices of any of the other known types.

Control panels 11 embodying the present invention differ from prior apparatus of this kind in that one or more of the control devices 12 are situated at least partially within the image display area 16a of an electrically controlled image display screen 16 of one of the known types that can generate any desired image or images at any location in the image display area. Labels, calibration marks and other graphics 20 which assist the operator in identifying and adjusting the control devices 12 are images generated by the display screen 16 and can change instantly and automatically when the function of a control device changes or in response to operation of a control device. The display screen 16 of this example is a flat panel display and a flat panel display controller 17 of known design is coupled to the display screen to cause display of the changeable graphics 20.

Situating the control devices 12 directly in front of the image display area 16a in this manner enables display of graphics 20 at locations which are close to the devices and which can be immediately adjacent to the knobs 12a, 12b, buttons 12c or the like that are manipulated by an operator. This avoids operator error with respect to associating the graphics with the particular control device to which they relate and enables precision setting of control devices.

The flat panel display 16 may be of any of the known types which have an array of minute spaced apart image pixels 29 arranged in rows and columns of pixels at the image display area 16a of the display screen any of which can be caused to emit or transmit light as may be necessary to define a particular image. The flat panel display 16 may have any of the known constructions except as hereinafter described.

Figure 2:
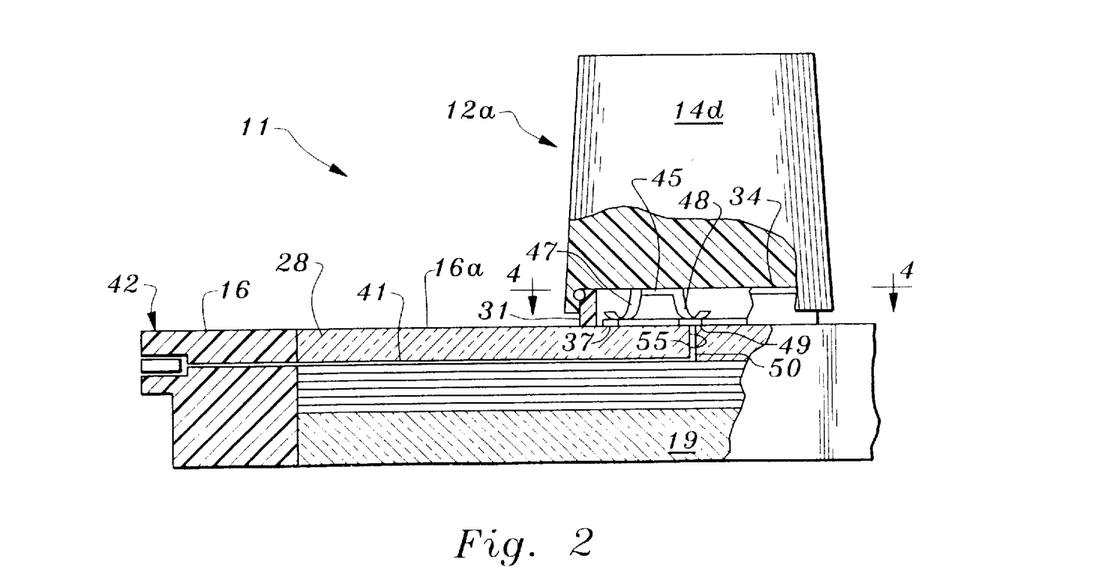
FIG. 2 is a broken out view of a portion of one side of the control panel of FIG. 1 taken along line 2—2 thereof.
Figure 3:
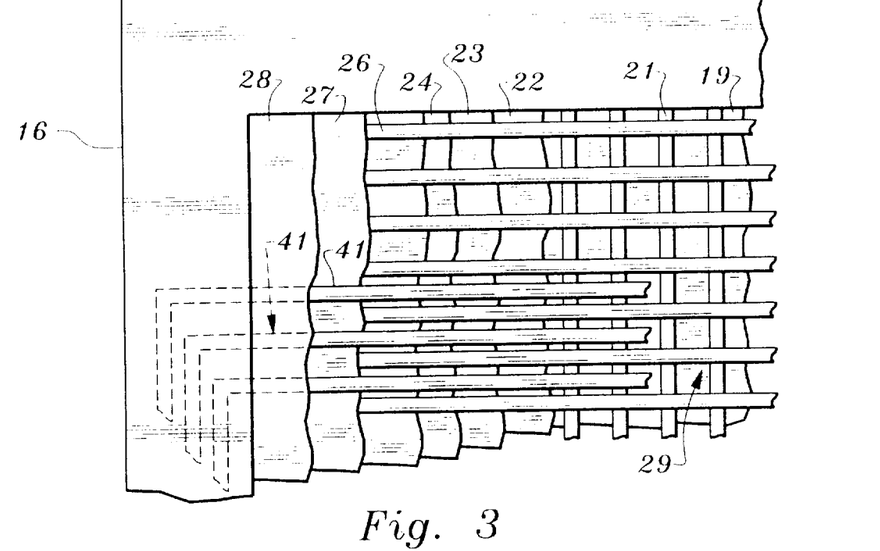
FIG. 3 is a broken out frontal view of a portion of the control panel of the preceding figures showing the multilayered construction of a flat panel display screen which is a component of the apparatus of the preceding figures.

Referring jointly to FIGS. 2 and 3, for purposes of example the flat panel display 16 of this particular embodiment is of the TFEL (thin film electro-luminescent) type. Flat panel displays 16 of this kind are multi-layered and have a flat glass or ceramic substrate 19 overlaid, in sequence, by a layer of row busbars 21, a first dielectric layer 22, a phosphor layer 23, a second dielectric layer 24, a layer of column busbars 26, a sealing and passivation layer 27 and a transparent cover plate 28 which may be glass or clear plastic. Row bus-bars 21 are parallel conductive traces bonded to substrate 19 and extend in an x-coordinate direction. Column busbars 26 are similar conductive traces deposited on the second dielectric layer 24 and extend in a y-coordinate direction. The points at which the row and and column busbars 21 and 26 cross each other define the image pixels 29 at which the phosphor layer 23 emits light when a voltage difference is applied across the row and column busbars that cross each other at a particular pixel location. Thus any desired image can be produced by applying a voltage difference across the particular row busbars 21 and column busbars 26 that define image pixels 29 at which light needs to be emitted to form the image.

At least the second dielectric layer 24 and sealing and passivation layer 27 and cover plate 28 are formed of light transparent material. Row busbars 21 are preferably formed of low resistivity opaque metal conductor while the column busbars 26, which are in front of the phosphor layer 23, are formed of transparent conductive material such as indium tin oxide.

For clarity of illustration certain components of the display screen 16 are shown in the drawings with a greater thickness, greater spacing and/or as being fewer in number than is actually the case in a typical display screen which embodies the invention. Such components may be too minute to be depicted with the preferred sizes and spacings in drawings which depict the entire display screen 16 or a sizable portion of the screen. For example, the busbar conductors 21 and 26, insulation layers 22, 224 and phosphor layer 23 are typically extremely thin films which may be formed by photolithic techniques and deposition techniques known to the art. Busbar conductors 21 and 26 are typically more minute, greater in number and more closely spaced than can be depicted in FIGS. 2 and 3. In order to provide images which exhibit desirably high resolution there may, for example, be 80 to 300 busbar conductors per inch and thus a similar number of image pixels 29 per inch.

Figure 4:
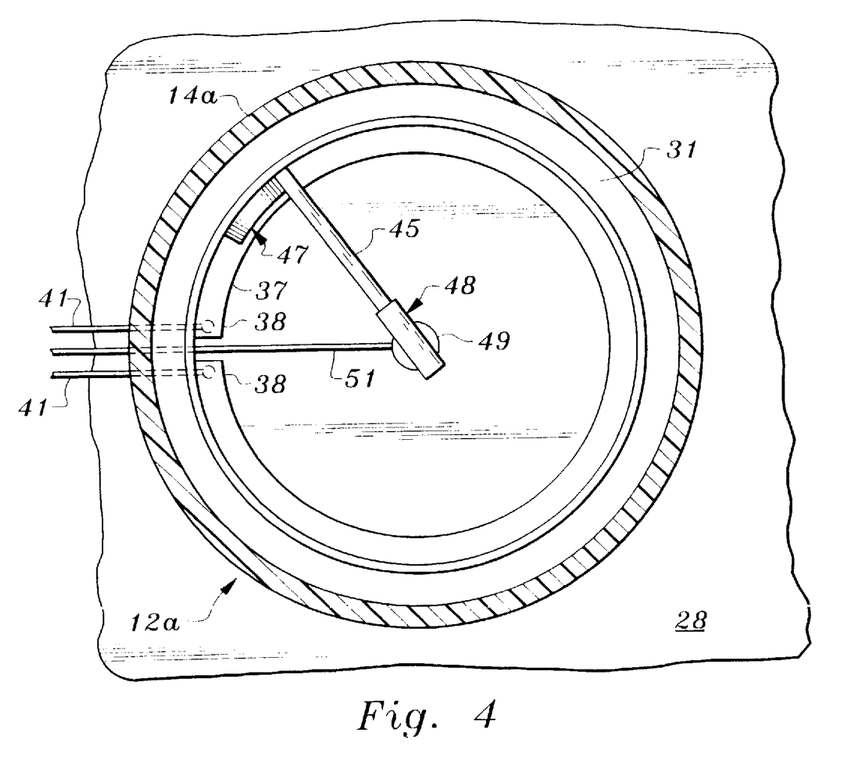
FIG. 4 is a section view taken along line 4—4 of FIG. 2.

Referring to FIGS. 2 and 4, the circuit control devices such as potentiometer 12a are secured to the transparent cover plate 28 preferably by an adhesive or by solder glass. In this particular example, the turnable knob 14a of the potentiometer 12a snap engages onto an annular lip 34 which extends from an annular fixed base 31 that is adhered to the face of the cover plate 28. The resistor 37 of the potentiometer is a discontinuous circular trace of resistive conductor bonded to the face of the cover plate 28 within base 31. A conductive wiper 45 secured to the underside of knob 14a has a first resilient arm 47 which contacts and ride along the circular trace 37 as the knob is turned and a second resilient arm 48 that contacts a conductive pad 49 bonded to the cover plate 28 at the center of base 31. Thus the two ends 38 of resistor 37 are terminals for connection across a voltage source and conductive pad 49 is an output terminal for delivering a control signal to an external circuit in the form of a voltage having a magnitude that is selected by an operator.

Other forms of circuit control device which may fastened to the display screen 16 within the image area 16a have differing constructions but all have at least one terminal requiring connection to an external circuit. The present invention enables one or more of the circuit connecting conductors 41 to extend along a surface of the cover plate 28 within the image area 16a of the display screen in a manner which avoids or minimizes obscuring of image pixels. The circuit connecting conductors 41 in this embodiment extend from the circuit control devices such as potentiometer 12a to a connector 42 situated at an edge of the display screen 16 through which the devices may be electrically coupled to the controlled circuit and to a voltage source and/or electrical power supply if needed. In some instances, the controlled circuit may be situated on or within a marginal region of the display screen 16, outside the image viewing area 16a, or may be attached to the back of the display screen in which case the connector 42 may not be needed.

The conductors 41 are preferably traces of conductive material bonded to a surface of the cover plate 28 and may be formed of indium tin oxide or other transparent conductor or be formed of opaque metal conductor, such as copper, silver alloy or aluminum for example, which is preferable in many instances as it has a substantially lower electrical resistivity. Transparent conductors must be wider and/or thicker than metal conductors in order to have a desirably low electrical resistance per unit length. In the absence of arrangements to be hereinafter described, significant image degradation can be caused by transparent conductors 41 extending within the image viewing area 16a as well as by opaque metal conductors as light refraction by the transparent conductors can detract from image quality.

Avoidance or minimization of obscuring of image pixels is accomplished by positioning and aligning the circuit connecting conductors 41 in one or more specific relationships to the rows and columns of image pixels 29. Referring again to FIG. 1, a first arrangement for this purpose is to align the conductor 41 in parallel relationship with either the rows 43 of pixels 29 or the columns 44 of pixels and to position the conductor to overlay and extend along a zone 46 that is between two lines of pixels that are adjacent to each other, the conductor 41 preferably being equidistant from the two lines of pixels.

Referring again to FIGS. 2 and 3, the circuit connecting conductor 41 is preferably located sufficiently close to the image pixels 29 avoid obscuring of a line of pixels by the conductor when the observer views the screen 16 obliquely from any viewing angle within the range of viewing angles of the particular screen. For this purpose the conductors 41 can be located at the back surface of the cover plate 28 and be connected to terminals 38, 49 at the front surface of the plate by conductive members 50 which extend through sealed passages 55 in the cover plate. The spacing of the conductor 41 from the pixels 29 is then only the combined thicknesses of the sealing and passivation layer 27, column busbar layer 26 and the second dielectric layer 24 each of which is a very thin film.

Figure 5:
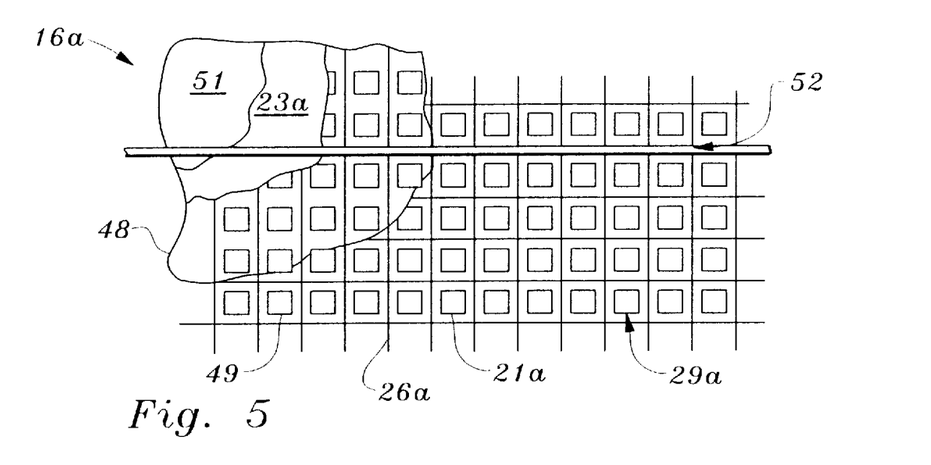
FIG. 5 is a diagrammatic view of a portion of a flat panel display of the active matrix type as used in the context of the present invention.

In a display screen 16 of the type shown in FIGS. 2 and 3, the pixels 29 are the regions of the optically active layer, such as phosphor layer 23, that extend between a row busbar 21 and a column busbar 26 at the locations where row busbars and column busbars cross each other. Thus as previously described the circuit connecting conductors 41 are at locations where they are not directly in front of the outermost layer 26 of busbars in order to avoid obscuring of pixels. Referring to FIG. 5, the pixels 29a are at different locations relative to the busbars 21a, 26a in flat panel display screens 16a of the active matrix type. In display screens of this type, both busbar layers are at the same side of the optically active layer 23a and are separated by a thin film insulating layer 48. The image pixels 29a are defined by minute electrodes 49 each of which is offset from the location at which a column busbar 26a crosses a row busbar 21a. The image pixels 29a are the regions of the optically active layer 23a that extend between an electrode 49 and a ground plane layer 51 which is at the opposite side of the optically active layer. In display screens 16a of this type the circuit connecting conductors 41a are positioned to overlay zones 52 that are between two rows or columns of the electrodes 49 and may directly overlay busbars 21a or 26a. Aside from the presence of the circuit connecting conductors 41a, the active matrix display screen 16a may be of any of the known constructions.

In the above described embodiments of the invention the circuit connecting conductors 41 are internal components of the screen 16 which must be installed at the time of manufacture of the screen. Alternately, the conductors 41 can extend along the front surface of the cover plate of a display screen or, with reference to FIGS. 6 and 7, can extend along the front or back surface of a transparent overlay cover plate 53 that overlays the pre-existing cover plate 28 of a display screen 16 and which is precisely registered with the screen. The circuit control device 12 or devices are secured to the front surface of the overlay cover plate 53 rather than to the original cover plate 28.

In each of these alternate arrangements, the conductors 41 are further away from the plane of the image pixels 29 than is the case where the conductors are at the back surface of the original cover plate 28. This does not result in any impairment of the image if the viewer observes it along a line of sight that is perpendicular to the screen 16 or close to perpendicular to the screen. However at some oblique viewing angle, determined by the spacing of a conductor 41 from the pixels 29, the conductor will cause an apparent dimness of a line of pixels. In the screen depicted in FIG. 6 this occurs when the observer's line of sight is at the angle indicated by arrow 54 in the drawing. If all of the conductors 41 have the same spacing from the closest line of pixels 29 then all conductors will dim lines of pixels at the same time when the screen is viewed from a particular viewing angle.

Referring again to FIGS. 6 and 7 in conjunction, this occluding of a plurality of lines of pixels 29 at one time can be avoided or minimized if each conductor 41 has a different spacing relative to the two lines of pixels 29 that are closest to the conductor. The spacing of two conductors 41 from each other is then an integral multiple of the distance between the centers of successive pixels plus a fraction of that distance, the fraction being a different fraction for each successive conductor if there are more than two conductors.

Figure 8:
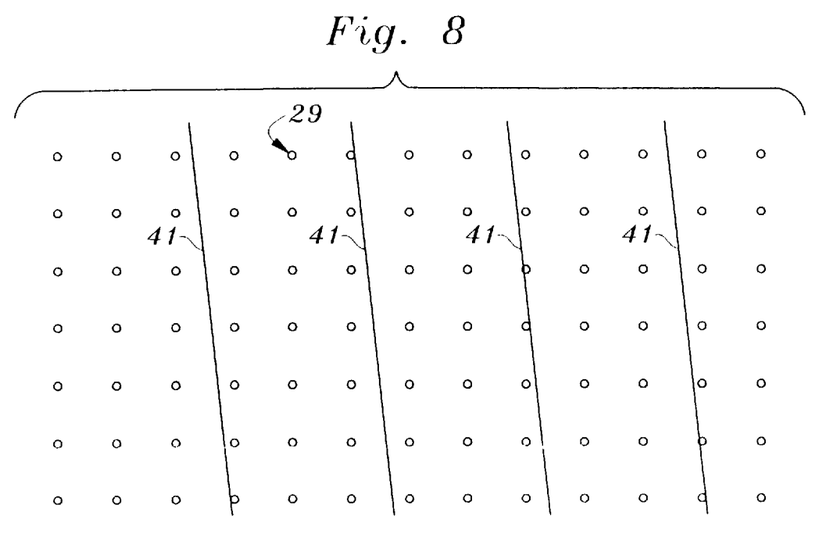
FIG. 8 is a diagrammatic view illustrating an arrangement of electrical conductors in relation to image pixels which avoids or minimizes obscuring of images.

Referring to FIG. 8, dimming of an entire line of pixels 29 at one time can be avoided by angling the circuit connecting conductors 41 relative to the lines of pixels 29 along which they extend. Under this condition a conductor 41 crosses any given line of the pixels 29 only at one location in the line of sight of an observer. The conductor may cross more than one line of pixels 29 but if the angling is small the locations on two successive lines of pixels that are affected are far apart and do not cause a significant loss of image quality. Preferably the conductors 41 are angled from about 1° to about 5° relative to the lines of pixels 29 along which they extend although other degrees of angling can also have beneficial effects. It is advantageous if different ones of the conductors 41 extend at slightly different angles as this randomizes the distribution of obscured pixels 29. An ordered or patterned array of obscured pixels is more noticeable than a random array.

Figure 6:
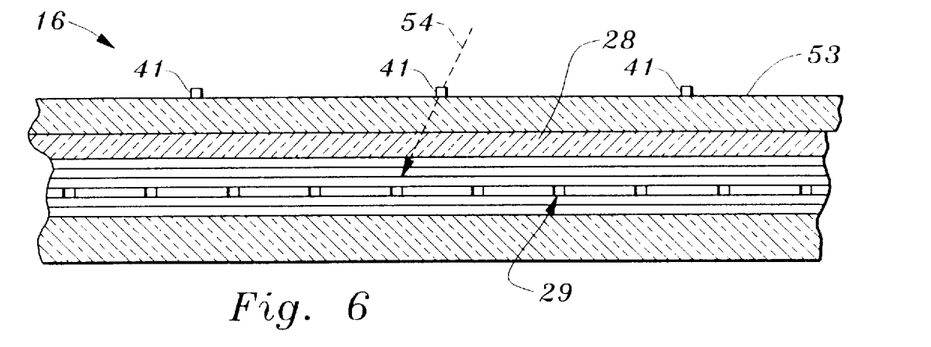
FIG. 6 is a section view of a portion of another control panel embodying the invention.
Figure 7:
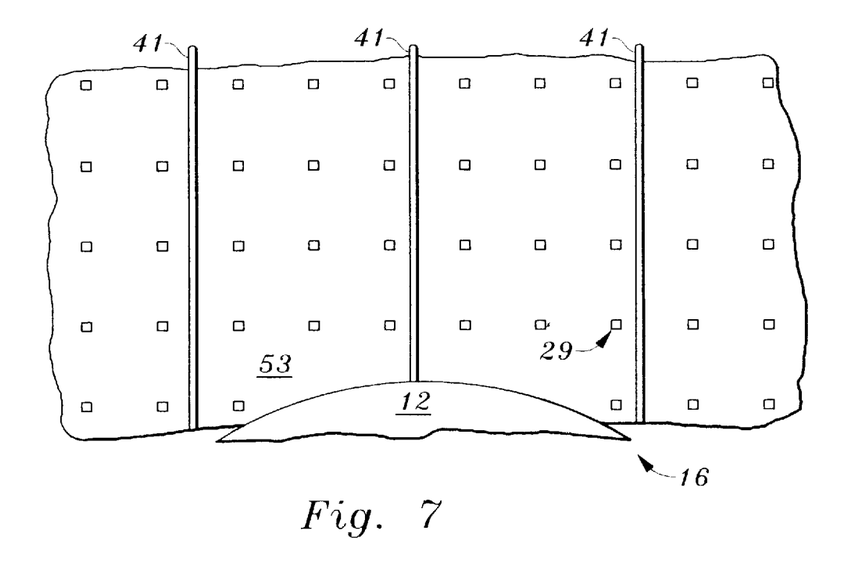
FIG. 7 is a frontal view of the apparatus of FIG. 6.
Figure 9:
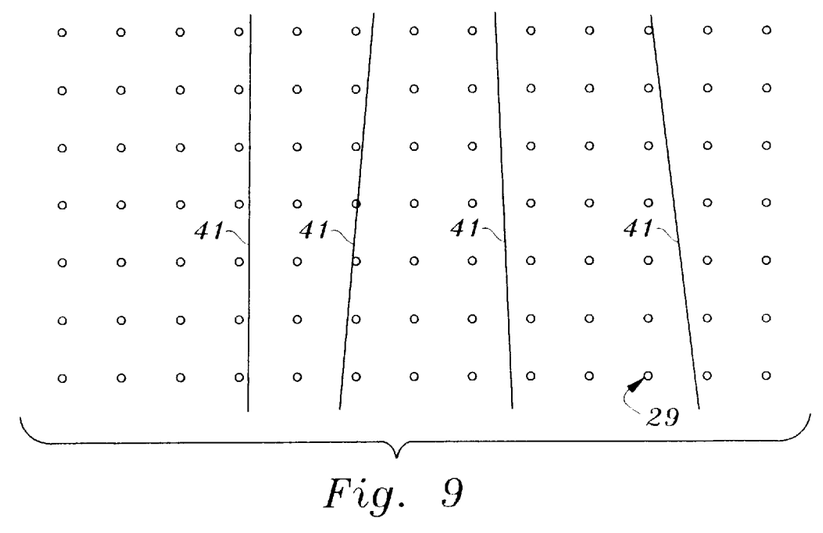
FIG. 9 is a diagrammatic view illustrating another arrangement of electrical conductors in relation to image pixels which avoids or minimizes obscuring of images.

Referring now to FIG. 9, randomizing of the distribution of obscured pixels is optimized if the circuit connecting conductors 41 are both angled as described with reference to FIG. 8 and have differing spacings from the two closest lines of pixels 29 as described with reference to FIGS. 6 and 7.

Figure 10:
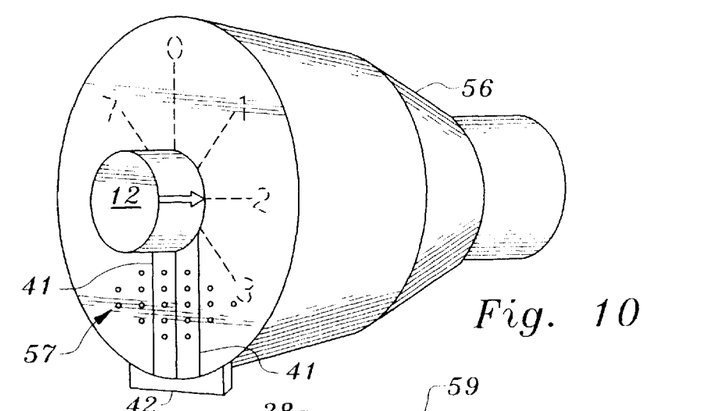
FIG. 10 is a perspective view of another electrical circuit control panel which uses a cathode ray tube too display changeable graphics at a circuit control device.

The previously described embodiments of the invention utilize a flat panel type of image display screen 16. Referring to FIG. 10, the image display may be at the face of a cathode ray tube 56 of the known type which produces images at an array of pixels 57. One or more circuit control devices 12 are secured to the face of the cathode ray tube 56 within the image display area and changeable labels, calibration markings, instructions or other graphics may be displayed adjacent to or in proximity to the control devices. Circuit connecting conductors 41 extend along the transparent front face of the cathode ray tube 56 to one or more connectors 58 which enable coupling of the control devices 12 to the controlled circuit. The circuit connecting conductors 41 may be bonded to the outer or inner surface of the transparent front face of the cathode ray tube 56 or to a transparent overlay cover plate which overlays the original front face of the tube 56. The circuit connecting conductors 41 are positioned and aligned relative to the image pixels 57 in the manner which has been previously described with respect to the other embodiments of the invention.

Figures 11, 12, 13:
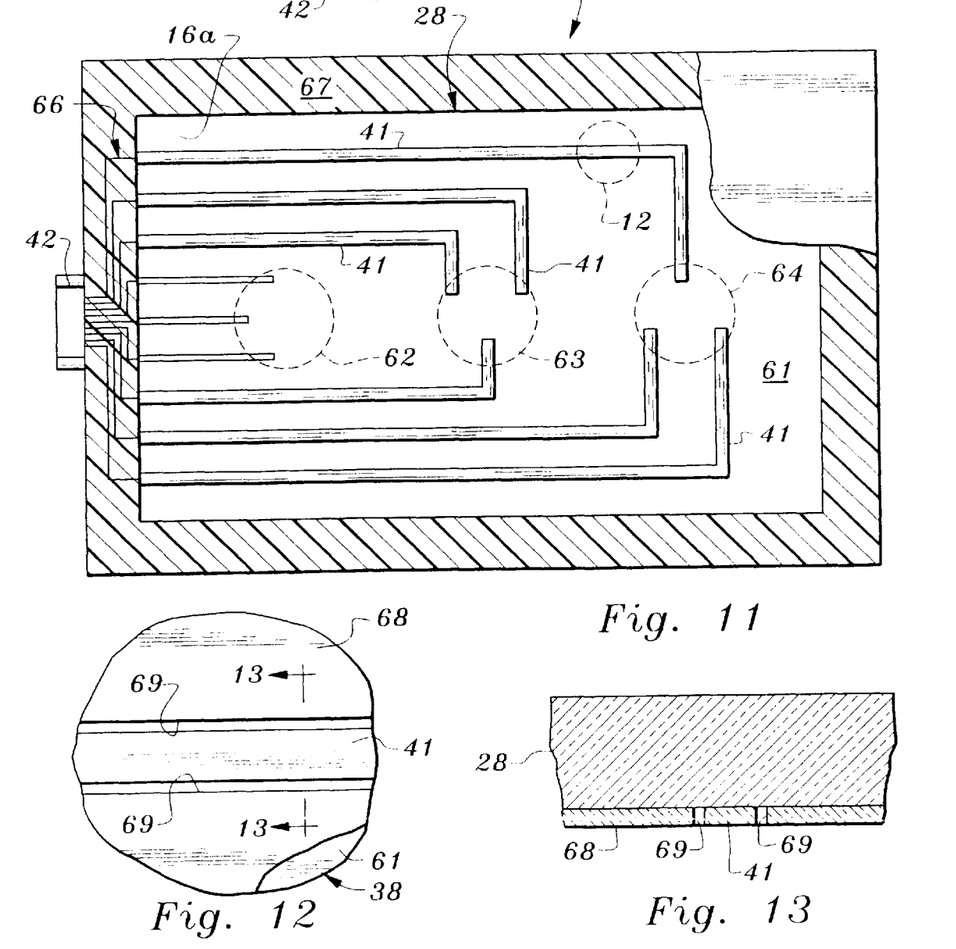

FIG. 11 is a broken out rear view of another circuit control panel 59 which may be similar to the embodiment of FIGS. 1 to 4 except as herein described. The circuit connecting conductors 41 which extend along a surface 61 of the transparent cover plate 28 or an overlay cover plate may have differing lengths owing to different distances of the circuit control devices 62, 63, 64 from the connector 42 through which the devices are coupled to the controlled circuit or owing to the configuration of a control device itself. The electrical resistances of the several conductors 41 are different if the conductors all have the same width and thickness. The presence of different degrees of electrical resistance in the several control signal paths can have adverse effects under some circumstances. If the control devices 62, 63 and 64 are identical potentiometers, for example, it may be necessary that each potentiometer deliver the same voltage to the controlled circuit when the potentiometers are at the same setting. This may not occur if there is a significant difference in the resistances of the several circuit connecting conductors 41. The effect is minimal when the conductors 41 are formed of low resistivity opaque metal such as copper, silver alloy or aluminum and is more pronounced when they are formed of a transparent conductive material such indium tin oxide which has a relatively high resistivity.

The resistances of the conductors 41 are equalized if the conductors 41 have different widths and or thicknesses selected to effect that result. In the present example, the conductors 41 which connect with circuit control devices 62, 63 and 64 are of progressively greater width to the extent necessary to equalize the resistances as the devices are progressively further away from the connector 42 where connection to a controlled circuit is made. The widths and/or thicknesses of conductors 41 which connect to each single one of the control devices 62, 63 and 64 can be varied for the same purpose if there is a significant difference in the lengths of such conductors. The portion of each individual conductor 41 which extends within the image display area 16a is of uniform width and thickness in this example. Variation of the widths and/or thicknesses of the conductors 41 to equalize the resistances can be confined to only limited portions of the conductors.

It is advantageous if only the portions of conductors 41 that are within the image display area 16a are formed of transparent conductor. The portions 66 of such conductors 41 that extend within the marginal region 67 of the flat panel display, outside of the image display area 16a, are preferably formed of opaque metal conductor of relatively low resistivity. The portions 66 may be substantially thinner than the transparent portions of the conductors 41. This minimizes the total resistance of each conductor 41 and reduces the amount of space that is needed to accommodate the conductors 41 within the marginal region 67 of the display screen.

The circuit connecting conductors 41 of the previously described embodiments are traces of conductor which are separated from each other by sizable areas where there is no conductive material. This does not have any noticeable effect when the conductors are very thin traces of opaque metal. The presence of the conductors 41 can be easily discernible by a viewer of the screen if they are relatively wide transparent conductors bounded by sizable areas where there is no transparent conductive material on the cover plate. Light refraction and differences in light transmissivity are believed to contribute to this effect. The transparent conductors 41 of FIG. 11 appear to be of this kind only because of the scale of the drawing. As may be seen in FIG. 12, which is an enlargement of the area of FIG. 11 encircled by dashed line 12 thereof, a thin film layer 68 of the transparent conductor is bonded to the surface 61 of cover plate 28 and is coextensive with the image display area 16a except at the edges of the conductors 41. Referring jointly to FIGS. 12 and 13, each circuit connecting conductor 41 is defined by a pair of thin parallel slots 69 in layer 68 at opposite sides of the conductor. The conductors 41 can be formed by initially depositing a continuous unbroken layer 68 of the transparent conductor on the cover plate 28 and then cutting the slots 69 with a laser or by etching or during the deposition process or by other processes that are used for such purposes in thin film technology.

Slots 69 are preferably made as thin as is possible with regard to the need to electrically isolate the conductor 41 from other portions of the layer 68. Slots 69 that are 18 microns wide, for example, are only barely discernible by a viewer of the screen and do not as a practical matter cause any significant degradation of the image.

Referring again to FIG. 1, electrical noise, particularly the scanning frequency of the flat panel display, may be transferred to the circuit connecting conductors 41. Such noise can be eliminated from the control signals by connecting the conductors 41 with the controlled circuit 13 through a low pass filter 70.

Control panels 11 embodying the invention may be used to provide operator selected control signals to any of the diverse different types of controlled circuit 13 that respond to such signals. For purposes of example only, the control panel 11 of FIG. 1 is shown displaying changeable graphics 20 which are appropriate when the controlled circuit 13 is a radio of the known design. A flat panel display controller 17 can change the graphics display instantly and automatically when the radio is switched between the AM and FM modes of operation or when the operator changes the station selection and can cause the panel to display such information as the current station selection, audio volume and the like. Display screens of the type used in the present invention can display images of any configuration, including color images and moving images, that is appropriate for operator control of other types of controlled circuit 13.

While the invention has been described with reference to certain specific embodiments for purpose of example, many modifications and variations are possible and it is not intended to limit the invention except as defined in the following claims.

I claim:

1. A control panel for an electrical circuit which control panel has at least one control device that can be manually operated to change an electrical condition in said circuit, said control panel having at least one circuit connecting conductor for electrically connecting said control device to said circuit and an electrically controlled image display screen which displays changeable images that convey information pertinent to operation of the control device, the image display screen having a transparent cover plate and an image display area thereat and wherein said changeable images are defined by a plurality of parallel lines of image pixels, wherein the improvement comprises:

said control device being attached to said transparent cover plate and being situated at least partially within said image display area and wherein said circuit connecting conductor extends along said transparent cover plate within said image display area, at least a portion of said circuit connecting conductor being positioned and aligned to overlay and extend along a zone that is located between a pair of said parallel lines of image pixels.

2. The apparatus of claim 1 wherein said portion of said circuit connecting conductor extends in parallel relationship with said pair of parallel lines of image pixels.

3. The apparatus of claim 2 wherein said portion of said circuit connecting conductor is substantially equidistant from said each of said parallel lines of pixels of said pair thereof.

4. The apparatus of claim 1 wherein said portion of said circuit connecting conductor extends in an angled relationship with said pair of parallel lines of image pixels.

5. The apparatus of claim 4 wherein said portion of said circuit connecting conductor is oriented at an angle of about 1° to about 5° relative to said pair of parallel lines of image pixels.

6. The apparatus of claim 1 wherein a plurality of the circuit connecting conductors extend along said transparent cover plate in an angled relationship said said parallel lines of image pixels, at least a first and a second of said circuit connecting conductors being differently angled relative to said parallel lines of image pixels.

7. The apparatus of claim 1 wherein corresponding points on each successive line of image pixels are spaced apart by a uniform distance and wherein a plurality of the circuit connecting conductors extend along said trans parent cover plate, the spacing of at least a first and a second of said circuit connecting conductors from each other being equal to a fraction of said uniform distance added to an integral multiple thereof.

8. The apparatus of claim 7 wherein said first and second circuit connecting conductors extend in an angled relationship to said lines of image pixels and in an angled relationship to each other.

9. The apparatus of claim 1 wherein said transparent cover plate has a layer of transparent electrically conductive material thereon, said circuit connecting conductor being a portion of said layer that is isolated from other portions thereof by a pair of slots in said layer which extend along opposite sides of said circuit connecting conductor.

10. The apparatus of claim 1 wherein a first and a second circuit connecting conductor extend along said transparent cover plate, said first circuit connecting conductor being longer than said second circuit connecting conductor, said first circuit connecting conductor being larger than said second circuit connecting conductor in at least one transverse dimension by an amount which substantially equalizes the electrical resistances of the first and second circuit connecting conductors.

11. The apparatus of claim 1 wherein said circuit connecting conductor extends to a marginal region of said image display screen which is outside of said image display area and extends along said marginal region of said image display screen, wherein portions of said circuit connecting conductor which extend within said image display area are formed of transparent conductor and portions of said circuit connecting conductor which extend within said marginal region are formed of opaque conductor.

12. The apparatus of claim 11 the opaque conductor has a lower electrical resistivity than the transparent conductor and is thinner than the transparent conductor.

13. The apparatus of claim 1 wherein said circuit connecting conductor is formed of opaque metal.

14. The apparatus of claim 1 wherein said transparent cover plate has front and back surfaces, said circuit control device being at said front surface and said circuit connecting conductor being a conductive trace which extends along said back surface and wherein said circuit connecting conductor is electrically connected to said circuit control device by a conductive element which extends through said transparent cover plate at a passage therein.

15. The apparatus of claim 1 wherein said transparent cover plate is an outer transparent cover plate overlaying an inner transparent cover plate of said flat panel display.

16. The apparatus of claim 1 wherein said image display screen is a flat panel display having a first layer of spaced apart parallel busbars and a second layer of parallel busbars which are orthogonal to the busbars of the first layer, said image pixels being at locations where busbars of said first layer cross busbars of said second layer and wherein said zone which said circuit connecting conductor portion overlays extends along a region which is between an adjacent pair of busbars of one of said layers thereof.

17. The apparatus of claim 1 wherein said image display screen is a flat panel display having a first layer of spaced apart parallel busbars and a second layer of parallel busbars which are orthogonal to the busbars of the first layer and wherein the image pixels are at locations which are adjacent to locations at which busbars of said first layer cross busbars of said second layer, and wherein said zone which said circuit connecting conductor overlays extends along a busbar of one of said layers thereof.

18. The apparatus of claim 1 wherein said image display screen is the screen of a cathode ray tube to which said control device is secured.

19. The apparatus of claim 1 further including a low pass filter, said circuit connecting conductor being connected to said electrical circuit through said low pass filter.

20. A control panel for an electrical circuit which control panel is comprised of:

a flat panel display having a transparent cover plate and an image display area thereat wherein changeable images are defined by a plurality of parallel lines of image pixels arranged in rows and columns of pixels, a manually operable electrical circuit control device secured to said transparent cover plate and being within said image display area, and at least a pair of circuit connecting conductors extending along said transparent cover plate within said image display area from said circuit control device to a marginal region of said flat panel display, wherein said circuit connecting conductors are parallel to lines of image pixels and overlay zones which are between lines of pixels.

21. A control panel for an electrical circuit which control panel is comprised of:

a flat panel display having a transparent cover plate and an image display area thereat wherein changeable images are defined by a plurality of parallel lines of image pixels arranged in rows and columns of pixels, a manually operable electrical circuit control device secured to said transparent cover plate and being within said image display area, and at least a pair of circuit connecting conductors extending along said transparent cover plate within said image display area from said circuit control device to a marginal region of said flat panel display, wherein said circuit connecting conductors extend in an angled relationship with lines of pixels.

22. A control panel for an electrical circuit which control panel is comprised of:

a flat panel display having a transparent cover plate and an image display area thereat wherein changeable images are defined by a plurality of parallel lines of image pixels arranged in rows and columns of pixels, corresponding points on successive lines of pixels having a uniform spacing, a manually operable electrical circuit control device secured to said transparent cover plate and being within said image display area, and at least a pair of circuit connecting conductors extending along said transparent cover plate within said image display area from said circuit control device to a marginal region of said flat panel display, wherein said circuit connecting conductors, wherein said pair of circuit connecting conductors are parallel and spaced apart from each other by a distance which is equal of a fraction of said uniform distance added to an integral multiple thereof.

* * * * *